(12) United States Patent
Northington et al.

(10) Patent No.: US 7,765,136 B2
(45) Date of Patent: *Jul. 27, 2010

(54) OPEN-ARCHITECTURE SYSTEM FOR REAL-TIME CONSOLIDATION OF INFORMATION FROM MULTIPLE FINANCIAL SYSTEMS

(75) Inventors: Cathy C. Northington, Virginia Beach, VA (US); Louis J. Goodson, Virginia Beach, VA (US)

(73) Assignee: Bank of America Corporation, Charlotte, NC (US)

( * ) Notice: Subject to any disclaimer, the term of this patent is extended or adjusted under 35 U.S.C. 154(b) by 1833 days.

This patent is subject to a terminal disclaimer.

(21) Appl. No.: 10/837,692

(22) Filed: May 4, 2004

(65) Prior Publication Data
US 2004/0205011 A1 Oct. 14, 2004

Related U.S. Application Data

(60) Division of application No. 09/638,954, filed on Aug. 16, 2000, now abandoned, which is a continuation of application No. 09/166,069, filed on Oct. 5, 1998, now Pat. No. 6,128,602.

(60) Provisional application No. 60/063,633, filed on Oct. 27, 1997.

(51) Int. Cl.
G06Q 40/00 (2006.01)
(52) U.S. Cl. ...................................................... 705/35
(58) Field of Classification Search .................. 705/35, 705/40
See application file for complete search history.

(56) References Cited

U.S. PATENT DOCUMENTS
5,189,608 A * 2/1993 Lyons et al. .................. 705/30
(Continued)

FOREIGN PATENT DOCUMENTS
EP 0 865 178 A2 9/1998
(Continued)

OTHER PUBLICATIONS

Barnes, K.D. and Leuze, M.R., "Financial Automated Management Environment," Proceedings, High-Performance Computing and Networking, International Conference and Exhibition HPCN Europe 1996, Brussels, Belgium, Apr. 15-19, 1996, 946-947 (Springer-Veda(].Germanv 1996) (XP000602338).*

(Continued)

*Primary Examiner*—Olabode Akintola
(74) *Attorney, Agent, or Firm*—Michael A. Springs; Moore & Van Allen PLLC

(57) ABSTRACT

An open-architecture system automatically consolidates information from a plurality of financial systems into a single accounting system without the need for expensive and time-consuming backroom procedures. The system enables an entity to use multiple independent and potentially incompatible financial systems to facilitate, control and monitor its spending, purchasing and other financial activities, while also enabling the entity to monitor and control all of these activities in real time. The system receives, processes and stores information obtained from a plurality of financial and/or other external computerized systems, and provides one or more authorized users with the ability to monitor financial transactions on-line and manipulate and control all financial transactions of the entity in real time using, for example, Web-browser software technology. Different users may have different levels of access to the financial transaction data obtained, processed and stored by the system. The system may also be readily integrated with the entity's existing computer systems.

10 Claims, 11 Drawing Sheets

U.S. PATENT DOCUMENTS 5,917,912 A * 6/1999 Ginter et al. ............... 713/187
5,991,750 A * 11/1999 Watson ...................... 705/44
6,128,602 A * 10/2000 Northington et al. ......... 705/35

FOREIGN PATENT DOCUMENTS

WO      WO 97/08635 A1    3/1997
WO      WO 97/36253 A1   10/1997

OTHER PUBLICATIONS

Ernst & Young LLP and Antares Alliance Group Announce Agreement to Deliver Three-Tier Distributed Computing Solutions, The Gale Group, PR Newswire Assoc. Inc. (1996).*

Barnes, K.D. and Leuze, M.R., "Financial Automated Management Environment," Proceedings, High-Performance Computing and Networking, International Conference and Exhibition HPCN Europe 1996, Brussels, Belgium, Apr. 15-19, 1996, 946-947 (Springer-Verlag, Germany 1996) (XP000602338).

"Correction—Desktop Data, Inc.," Information Access Company, PR Newswire Association, Inc. (1997).

Kalakota, R. and Whinston, B., Electronic Commerce, 66-70, 75, 83, 84, 96, 105, and 106.

Kenny, K.F.L., "Open Systems Technology and the Transformed Business Architecture—The Accounting Systems Perspective," PACIS. 1993 Pan Pacific Conference on Information Systems Proceedings, Kaohsiung, Taiwan, May 30-Jun. 1, 1993, 133-140 (Nat. Sun Yat-Sen Univ., Taiwan, China 1993) (XP002095276).

Reuters plans Intranet-based financial launch Reuters Markets (Later in Mar. 1997, Reuters will service delivered over a company's intranet, Multimedia Business Analyst, (10):4 (1997).

Sage, D., "Internet broadens scope of business opportunities," Wood Technology, 123(8): 31-33 (1996).

Schmerken, I., Reengineering Wall Street's Systems, Computer Review, 14-22 (1992).

Todd, D., "Accounting for Change," Informationweek, (297): 20-21 (1990) (XP002095277).

* cited by examiner

OPEN-ARCHITECTURE SYSTEM FOR REAL-TIME CONSOLIDATION OF INFORMATION FROM MULTIPLE FINANCIAL SYSTEMS

RELATED APPLICATIONS

The present application claims priority to U.S. Provisional Patent Application No. 60/063,633, filed Oct. 27, 1997, and entitled "Open Architecture System for Consolidating Multiple-Platform External Financial Systems."

FIELD OF THE INVENTION

The present invention relates to an open-architecture system for consolidating information from a plurality of independent computer systems, such as computerized financial systems, and providing on-line access to and management and reporting of the consolidated information.

BACKGROUND OF THE INVENTION

For a large-scale financial entity (such as a corporation, business conglomerate, government, or other large organization), effective and accurate monitoring and control of the financial activities of its divisions, departments, and employees may require a substantial investment of resources. Generally, different types of financial transactions of the entity are performed, controlled and monitored by different, independent computerized financial systems. Each independent financial system may operate on a different, possibly incompatible computer platform.

For example, an entity's travel purchasing transactions may be facilitated by a major credit card company such as American Express® using the American Express computer system. The entity's supply purchasing may be facilitated through a separate, independently-operated computer system, such as a Visa® credit card program offered by a bank. Cash expenditures may be recorded and processed manually or facilitated through a yet another independent financial system supporting ATM capabilities. The entity's payroll may be facilitated by yet another independent computer system. Payments to contractors and service providers may be facilitated by still another independent system. The larger and more diverse the entity's financial operations, the more independent financial systems may be used to facilitate, control, and monitor its various operations.

The transactions performed by each independent system may be periodically reported to the entity, for example, in the form of a statement printout or computerized listing of all transactions performed within a certain period of time. Thus, in order to monitor and control its comprehensive financial transactions for a given period of time, the entity must consolidate the reports received from each independent system. The consolidation process may require an investment of substantial time and resources by the entity. For example, in order to analyze and utilize financial transaction information gathered by multiple computerized financial systems, an entity may create a large accounting department of employees to manually consolidate and process all of the information from the various internal and external systems. The consolidation process (also known as "backroom" processing) may be performed with the assistance of a computerized system that processes and stores financial information from different internal and external computerized systems, for example, as input by the entity's employees. Thus, large and diverse entities often invest substantial resources in manual or computer assisted consolidation, or both, in order to obtain and consolidate into a usable format the financial data necessary to monitor and manage spending and purchasing.

The entity's reliance on periodic reports generated by multiple independent systems also makes it virtually impossible for the entity to monitor its comprehensive spending, purchasing, and other financial transactions on-line as transactions are processed and posted by each independent system. Periodic reporting functions of the independent systems inevitably create delays in the receipt by the entity of the information reported by the independent systems. Moreover, the process of consolidating the financial records needed to provide a comprehensive financial report for the entity at a given time from multiple independent systems may require a substantial amount of time and effort, effectively precluding the real-time monitoring of spending and purchasing activities within the entity.

In addition, any changes in transaction authorizations, such as spending limits on purchase transactions, must be communicated to the operator of each independent system for implementation, creating delays in the entity's ability to control its financial transactions.

In view of the drawbacks described above, there is a need for a system that enables easy, real-time consolidation, monitoring and control of an entity's financial transactions as performed by various independent computerized systems.

SUMMARY OF THE INVENTION

The present invention offers an open-architecture system for automatically consolidating information from a plurality of financial systems into a single system without the need for expensive and time-consuming backroom procedures. The system according to the present invention enables an entity to use multiple independent and potentially incompatible financial systems to facilitate, control and monitor its spending, purchasing, intra-entity transfers (wherein funds are transferred between divisions or departments within the entity by creating offsetting entries in the budgets of each division or department), and other financial activities, while also enabling the entity to monitor and control these activities in real time. The system according to the present invention may therefore be readily integrated into an entity's existing operations.

The open-architecture system according to the present invention receives, processes and stores information obtained from a plurality of financial and/or other computerized systems, and provides, via browser software technology, one or more authorized users with on-line, consolidated monitoring, management, and reporting of financial accounts and transactions performed by the financial systems. Different users may have different levels of access to the information processed and stored by the system.

The system according to the present invention provides an entity with the ability to administer and control in real time financial transaction capabilities at an individual account or "cardholder" level, at a group level (including a plurality of individual accounts) and at a global level (including all accounts within the entity). Administration and control functions at the individual, group and global levels may include: adding one or more new individual accounts to enable purchasing authority, establishing spending limits and rates of spending for new and/or existing accounts, establishing authorized "merchants" or sources from which account holders may make purchases or perform, and/or performing other types of financial transactions in accordance with the needs of the entity.

Additionally, the system according to the present invention provides real-time transaction management on individual, group and global levels. By accessing electronic account transaction information from financial systems such as purchasing organizations, the system according to the present invention provides the ability to track purchasing and spending activities of individuals, of separate groups, or the entire entity on-line, and to generate real-time electronic statements, invoices, inquiries, decision support, alarms, and controls.

The system may also enable reconciliation of transactions, wherein, for example, an individual enters an intent to perform a given transaction in advance (e.g., making a plane reservation), and then enters the actual transaction (e.g., the purchase of the plane ticket) into the system. The system automatically compares and reconciles the two entries. Upon accessing the individual's account using the system, non-matching transactions may be displayed. Matching transactions may be automatically reconciled and certified by the system.

The system according to the present invention further allows for automatic, real-time posting of transactions to the purchasing and selling entities, and provides employee expense reimbursement functions through transaction management interfaces. The systems may also provide for tracking of all transactions performed by an individual or group within the systems. These real-time and on-line tracking, posting and reporting capabilities enable an entity to monitor, administer and control purchasing, spending, and other financial transactions of the entity on multiple levels as desired by the entity, and offer the potential for greatly reducing costly manual procurement and backroom processes.

The elements and components of the system according to the present invention may be implemented using software, hardware or a combination thereof. Moreover, the elements and components of the system may be implemented with a single computer, multiple computers within a distributed network, or any appropriate configuration of software, hardware, or both as may be apparent to one of skill in the art.

An open-architecture system for consolidating financial systems of an entity in accordance with the present invention includes the following elements:

- A network services and gateway element that enables communication between the open-architecture system and one or more independent computer systems;
- A data repository services element that organizes and stores data generated, received and processed by the open-architecture system. Data stored within this element may include information obtained from the independent computer systems, information input by one or more users, information from existing computer systems of the entity, and/or information obtained from Internet sources;
- An application services element that processes and formats incoming and outgoing data and provides server-based connectivity and application-based interaction with the independent computer systems and any existing computer systems of the entity;
- A web services element that provides user access to the information stored and obtained by the system via one or more remote terminals, for example using browser software technology. The web services element also enables transmission of data requests, management and control commands, report requests, and data between the system and the remote terminal in accordance with the user's level of security clearance or access level. The web services element may also include an Internet server to provide Internet access capabilities, for example, to enable users to perform purchasing and other transactions via the Internet; and
- A communications network within the open-architecture system that enables communication among the network and gateway services element, the data repository services element, the application services element, and the web services element.

The system according to the present invention may be integrated with an entity's existing computerized business systems, for example, by exchanging data with personnel, accounting and/or other computerized systems already in place within the entity.

User access to and ability to alter financial information stored and obtained by the system may be controlled by various security systems as are known to those of skill in the art.

The foregoing and other features, aspects, and advantages of the present invention will become more apparent from the following detailed description when read in conjunction with the accompanying drawings.

DETAILED DESCRIPTION OF THE PREFERRED EMBODIMENTS

Figure 1:
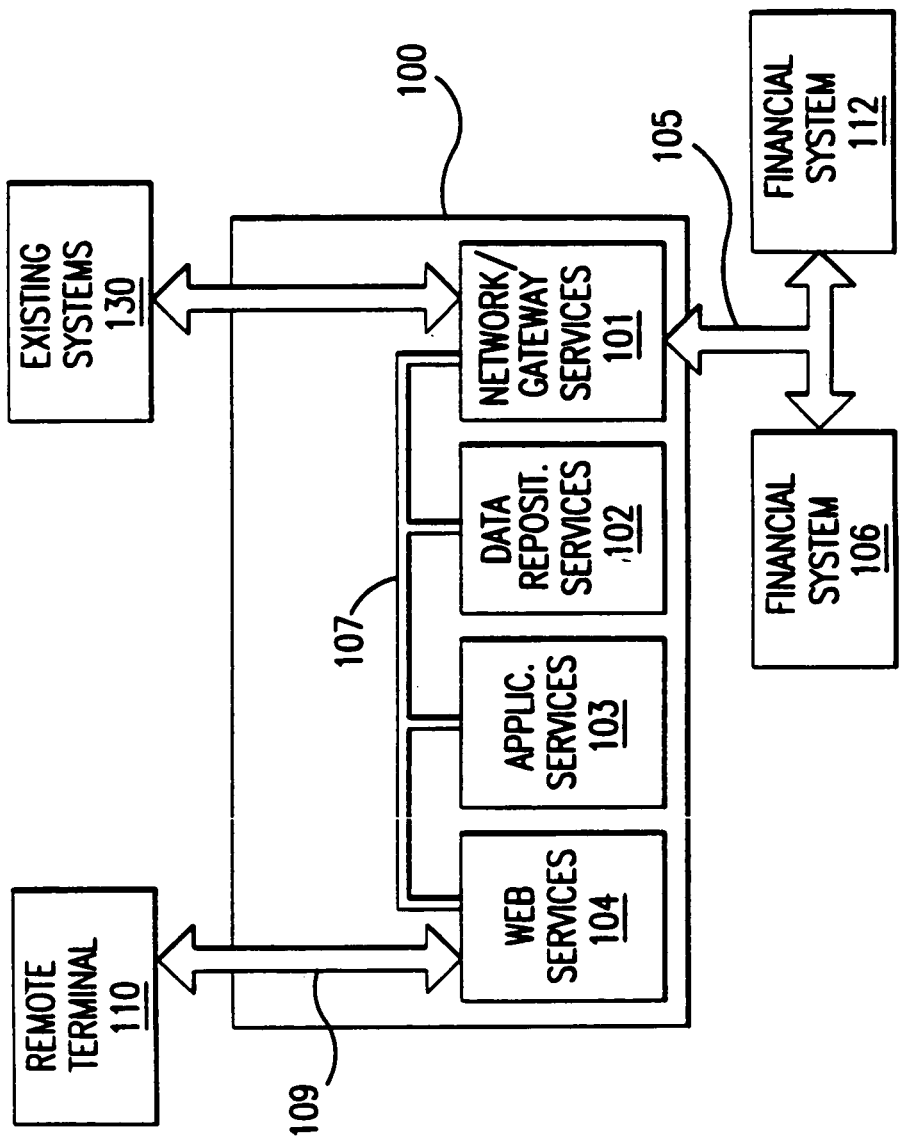
FIG. 1 provides a block diagram of the elements of a preferred embodiment of the open architecture system for consolidation of information from multiple financial systems according to the present invention.

The present invention will now be described with reference to the accompanying drawings, which are provided as illustrative examples of preferred embodiments of the present invention. Notably, the present invention is a novel combination of known components and may be implemented using software, hardware or any combination thereof as may be apparent to those of skill in the art. Like numbers in the drawings refer to like elements.

FIG. 1 provides a block diagram of the functional elements of a system 100 for consolidating information from financial systems according to the present invention. System 100 includes a gateway and network services element 101, a data repository services element 102, an application services element 103, and a web services element 104. A communications network 107, which may include hardwired and/or wireless communications links, links elements 101, 102, 103 and 104.

System 100 communicates with one or more independent computer systems, represented in FIG. 1 as financial systems 106 and 112, via a communications network 105. Financial systems 106 and 112 may represent such computer systems as credit card networks, automatic teller networks, electronic banking networks and systems, governmental financial networks, and other types of electronic commerce networks and systems through which an entity performs purchasing, spending, invoicing, payment or credit receipts, and other financial transactions.

As described above, system 100 may easily be used to integrate computerized accounting, human resources, and other systems already in use by the entity. These existing systems are represented by element 130 in FIG. 1.

Communications network 105 may comprise one or more hardwired digital or analog communication links, wireless digital or analog communication links, any combination thereof, or other means for establishing and operating communications links as may be known in the art.

In the preferred embodiment depicted in FIG. 1, one or more remote access desktops, represented in FIG. 1 as remote terminal 110, may be coupled to the web services element 104 of the system 100 by a communication link 109. Remote terminal 110 provides user access to the system 100, enabling users to access information, administer accounts, control spending and other account activities, request reports, and perform other functions or tasks. The functionality available to each user via remote terminal 110 may be customized in accordance with the needs performed by a user are determined by the end user's level of authorization to access the system 100. Remote terminal 110 may access the system 100 using, for example, browser software technology or other electronic accessing methods as may be known to one of skill in the art. In an embodiment of the present invention in which remote terminals access the system 100 using browser technology, financial reports and other information displayed to the end user by the remote terminals may be displayed using known web page formatting techniques.

In the preferred embodiment depicted in FIG. 1, communication link 109 links remote terminal 110 to the web services element 104 of the system 100. Link 109 may be a hardwired link, for example, a telephone line, coaxial cable, digital data line, or a wireless link, for example, a radio frequency or infrared communications link. Communications link 109 may also comprise a combination of hardwired and/or wireless links between the system 100 and remote terminal 110.

Figure 1A:
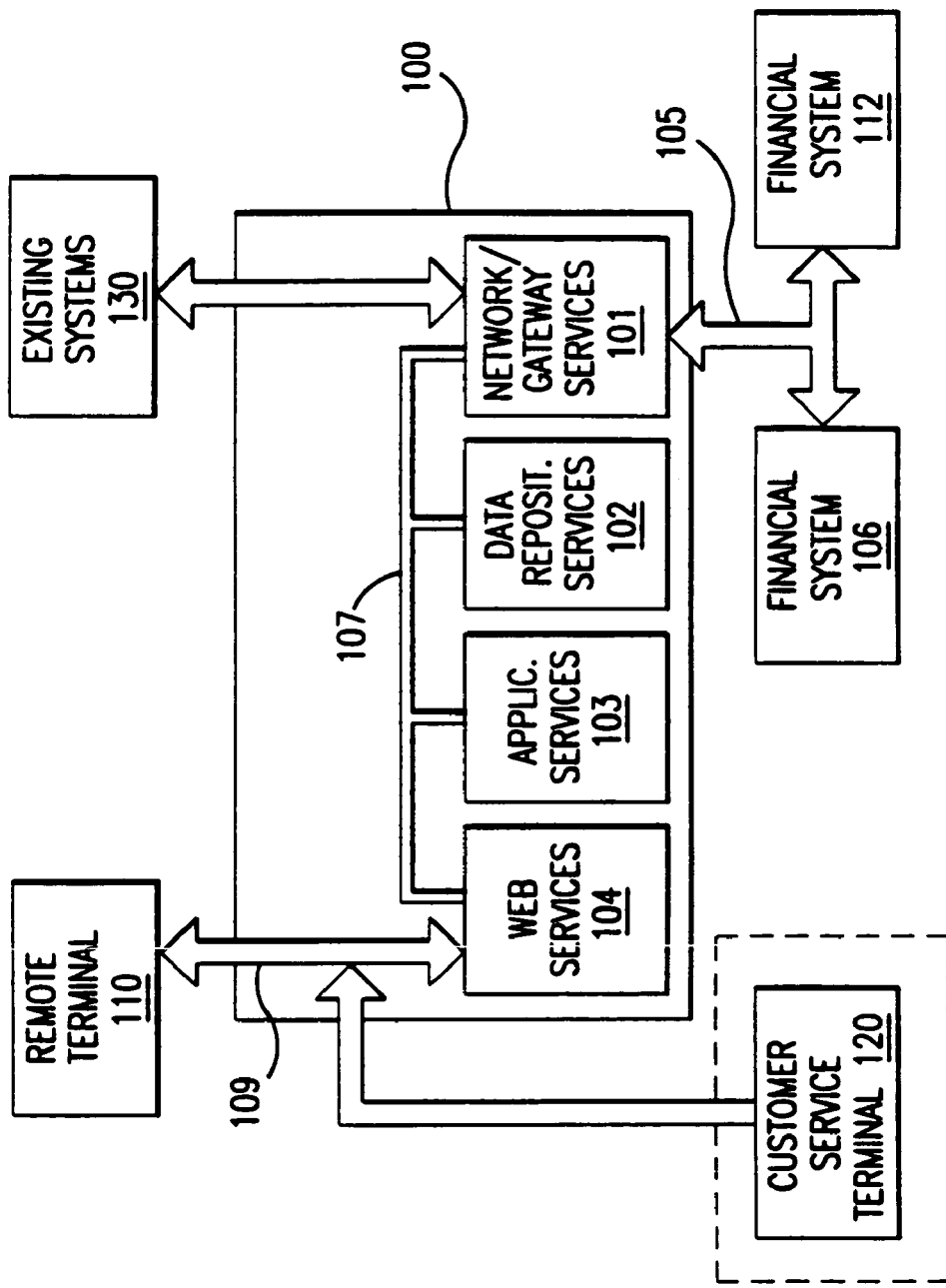
FIG. 1A provides a block diagram of the elements of a preferred embodiment of an open architecture system for consolidation of information from a plurality of financial systems according to the present invention, including an optional customer service access terminal.

An optional customer service access terminal 120, as shown in FIG. 1A, may comprise the hardware and/or software necessary to provide the access tools to enable customer service representatives using the desktop 120 to provide customer care to program cardholders, purchasing organizations, administrators, and merchants. Customer service access terminal 120 preferably provides the components necessary to access the functionality of the system 100 and data connectivity to external systems 106 and 112. Customer service access terminal 120 may be connected to system 100 via web services element 104. In an alternate embodiment (not shown), customer service access terminal 120 may be connected directly to the communication network 107 within system 100 or connected to the system via gateway and network services element 101.

Financial transaction data transmitted from the financial systems 106 and to the system 100 may include purchase and spending transaction data, account information data, and any additional data desired by the entity implementing the system 100. System 100 may further provide access, manipulation and modification capabilities with respect to any computerized data maintained by database repository element 102 or any external system (e.g., 106, 112, and/or 130).

Figure 1B:
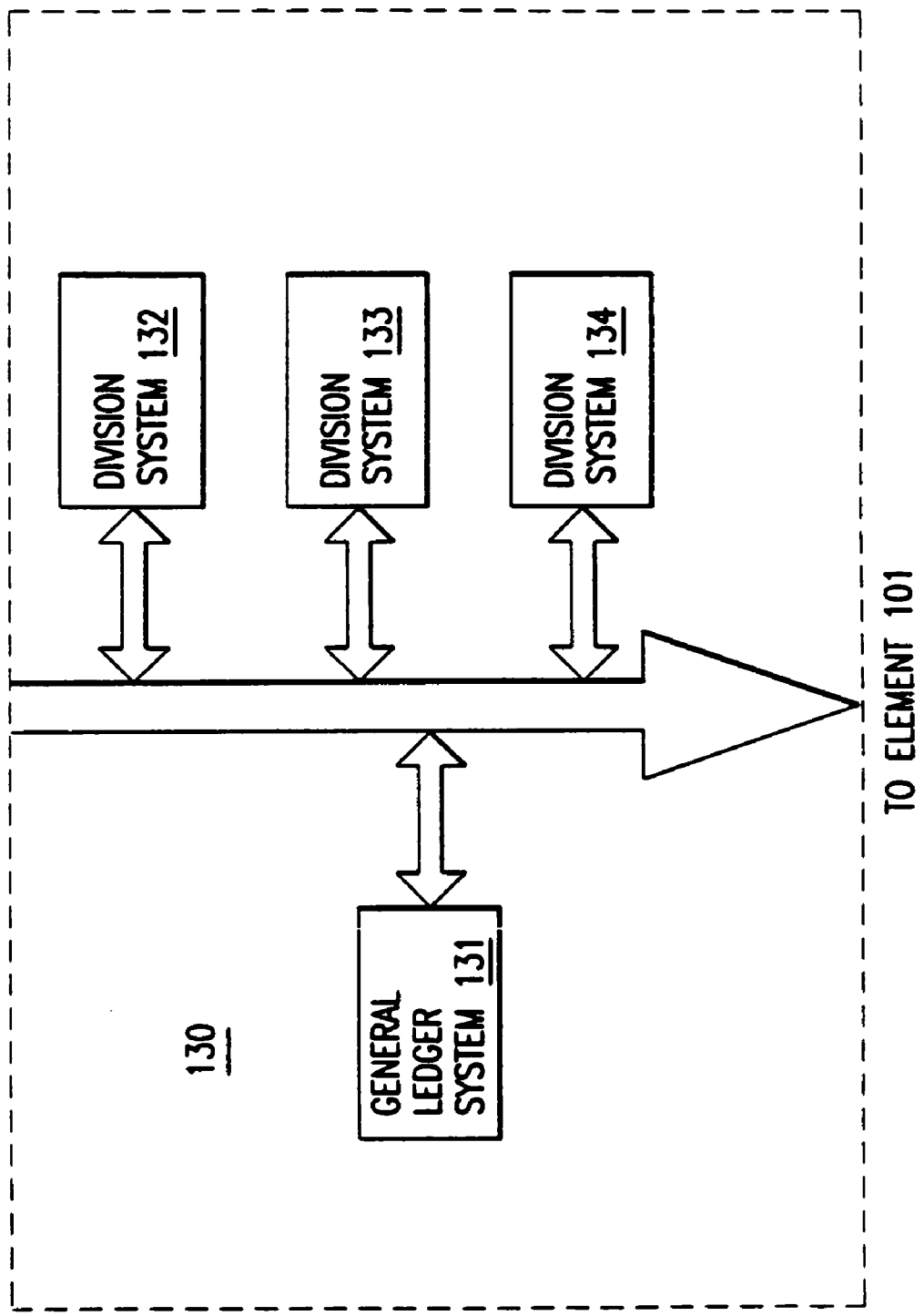
FIG. 1B provides a block diagram of the elements of a preferred embodiment of the existing systems component of FIG. 1.

FIG. 1B provides a block diagram of a preferred embodiment of existing systems component 130 shown in FIG. 1. As show in FIG. 1B, existing systems component 130 includes a general ledger system 131 and a plurality of division systems represented by elements 132, 133, and 134. The general ledger system 131 may maintain the overall financial records of the entity, while the division systems respectively maintain the financial records of divisions within the entity. Financial transactions maintained by the general ledger system 131 and division systems 132, 133, and 134 may include both financial transactions performed internally between two or more divisions within the entity as well as financial transactions performed between the entity and third parties. The system 100 may be implemented to track, store, and reconcile the financial transaction data maintained by the general ledger system 131 and division systems 132, 133 and 134 as described in additional detail below.

Figure 2:
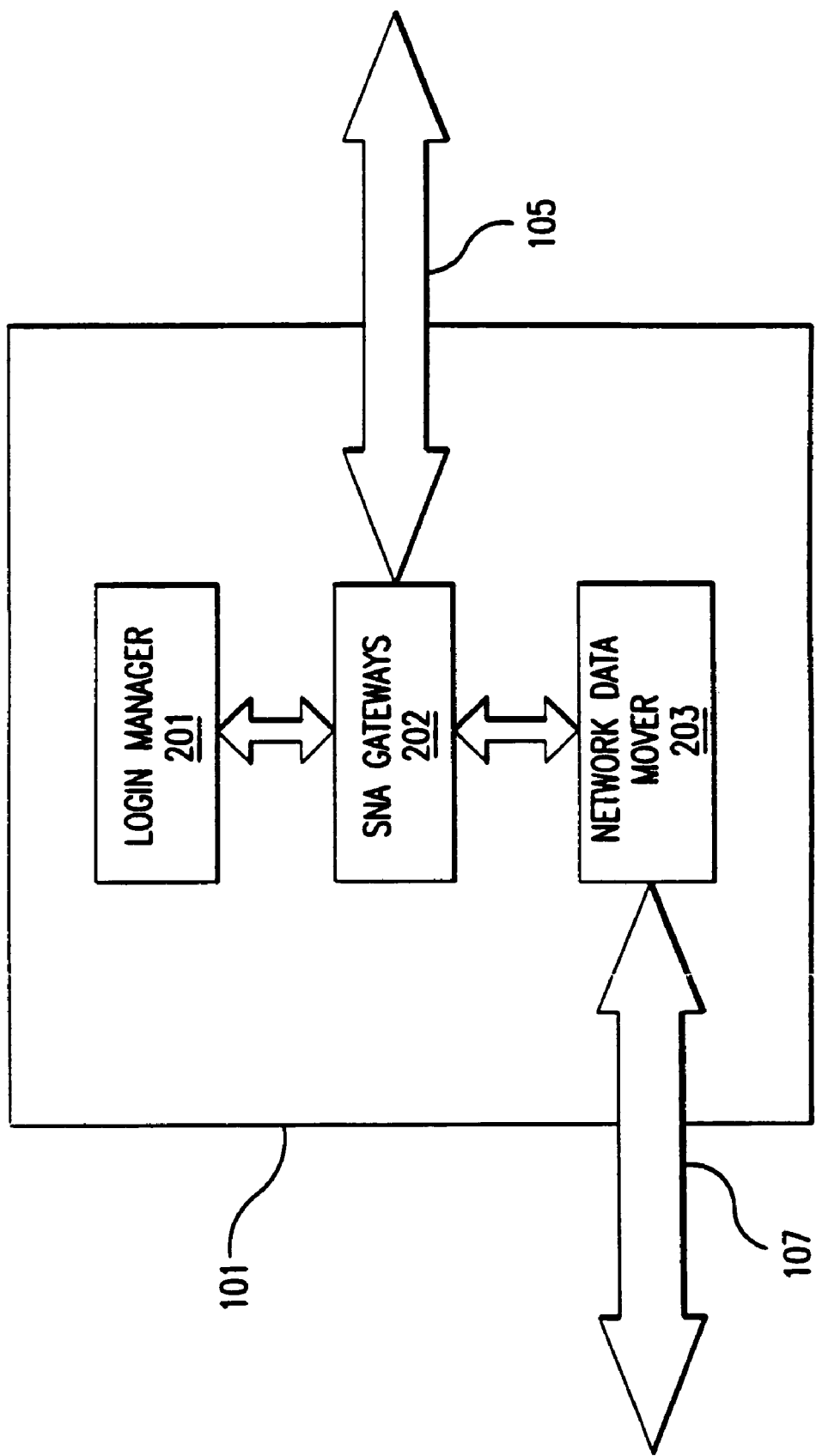
FIG. 2 provides a block diagram of a preferred embodiment of a gateway and network services element for use in the system depicted in FIG. 1.

FIG. 2 depicts a preferred embodiment of a gateway and network services element 101 for use in the system 100 shown in FIG. 1. This element 101 supports communication between the system 100 and financial systems 106 and 112 (depicted in FIG. 1) via communications network 105. In addition, element 101 also provides connectivity for other external interfaces of system 100, such as interfaces to existing systems 130 (depicted in FIG. 1). Thus, the connectivity provided by network services and gateway element 101 enables integration of the system 100 with the entity's existing computer systems.

As depicted in FIG. 2, a preferred embodiment of a gateway and network services element 101 includes a login manager 201 for controlling login and handshaking functions between system 100 and all external interfaces, including financial systems 106 and 112. The login manager 201 also performs security functions to prevent unauthorized internal and external access to system 100, for example, using encryption, password and/or other security techniques known to one of skill in the art. One or more Systems Network Architecture ("SNA") gateways 202 are used to transmit and receive data and electronic messages from the financial systems 106 and 112 and existing systems 130 via communications network 105. The SNA gateways 202 may be configured using network gateway protocols as may be known in the art, and the information necessary to identify the receiving system and to complete data transfers with the receiving system is configured based upon the protocols used by the systems 106, 112, and 130. Login manager 201 provides control data to SNA gateways 202 to control login, handshaking, and security.

In a preferred embodiment, a network data mover 203 may be implemented as an application within element 101 that transfers files from system 100 to the financial systems 106 and 112, existing systems 130, and other independent computer systems (not shown). Network data mover 203 is programmed to provide control commands to the SNA gateways 202 to establish sessions with these systems using session protocols known to one of skill in the art. Network data mover 203 also provides files for transfer to other systems and receives transferred files from other systems in accordance with pre-programmed file transfer and/or file request procedures and commands received from a session manager within application services element 103 (discussed below). Data files to be transferred to systems 106, 112, and/or 130 are also created and formatted by a processor 402 within the application services element 103 (discussed below). In a preferred embodiment, the application services element 103 requests a transfer procedure and transfers the data files to network data mover 203. In response, the data network mover 203 formats the files for transfer to external systems using transmission protocols as may be known to one of skill in the art, and transmits the formatted files to SNA gateways 202 for transfer to the external systems (e.g., 106 and/or 112).

Figure 3:
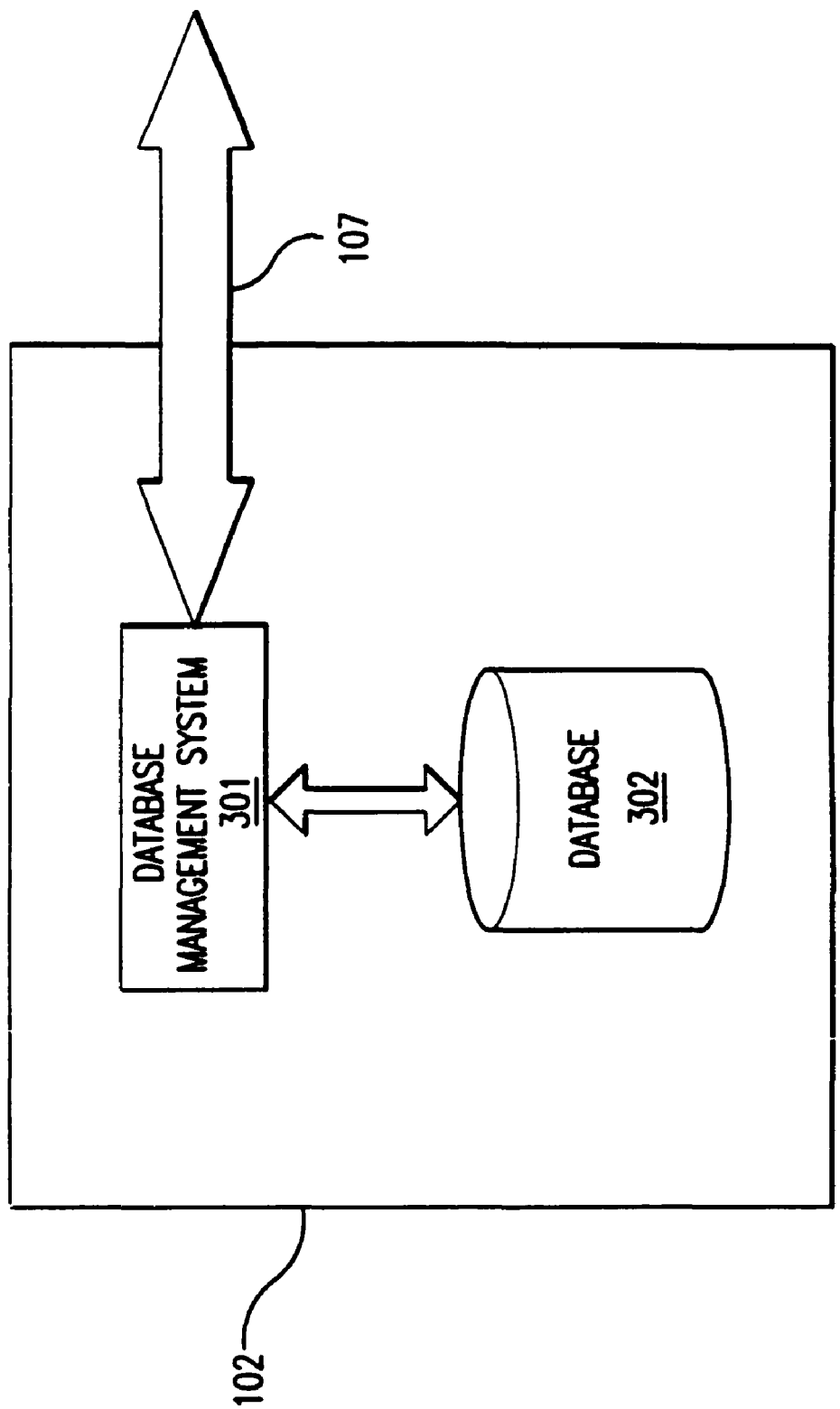
FIG. 3 provides a block diagram of a preferred embodiment of a data repository services element for use in the system depicted in FIG. 1.

As shown in FIG. 3, a preferred embodiment of a data repository services element 102 for use in the system 100 of FIG. 1 enables storage and retrieval of data managed locally within system 100. As depicted in FIG. 3, data repository services element 102 includes a database management system 301, such as an Oracle® relational database management system. Database management system 301 is programmed to run stored procedures necessary to support account inquiries and reports. The database management system 301 further provides administrative tools (such as administrative programs and data) for data base administration and data extraction. At least one database 302 is coupled to the database management system 301 for storing master account data, account spending control data, and transaction data and other current and historical data for system 100. Notably, components included in data repository services element 102 may be implemented using storage technology as may be known in the art.

Figure 4:
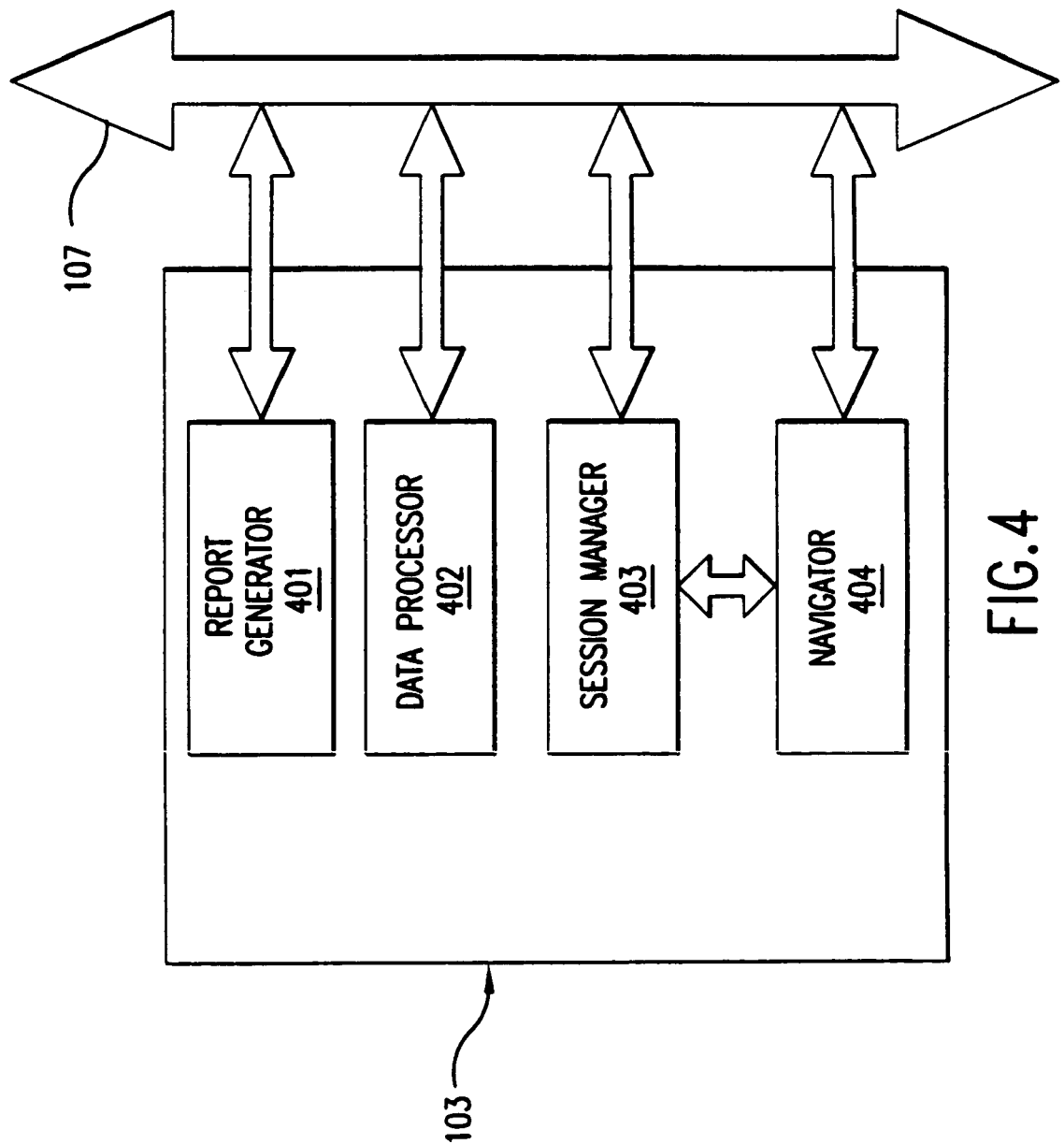
FIG. 4 provides a block diagram of a preferred embodiment of an application services element for use in the system depicted in FIG. 1.

FIG. 4 depicts a preferred embodiment of an application services element 103 for use in system 100. Application services element 103 preferably includes a data processor 402 for processing incoming transaction data and a report generator 401 for generating and delivering reports of stored transaction data in response to a command received from a user and/or at predetermined intervals. Data processor 402 is programmed with application logic to process and format batch uploads and downloads of data, as is know in the art. In a preferred embodiment, if a file is to be sent to an external system, the data processor retrieves the required data from the data repository services element 102, formats the data in accordance with predetermined formatting protocols as may be known in the art, and transmits the formatted file, via communication network 107, to the network and gateway services element 101 for transfer to an external system. If a file is sent to system 100 by an external system (e.g., 106 or 112), the file is received by network services and gateway element 101 and forwarded to data processor 402 via network 107. The data processor reads and processes the received file and may, for example, store corresponding data in the data repository services element 102.

Report generator 401 retrieves data from the data repository services element 102 for reporting purposes. Reports may be provided in response to a user request, for example, from remote terminal 110, or automatically in accordance with pre-programmed criteria (e.g., periodically or upon receipt of certain data inputs from an external financial system). In a preferred embodiment, users view a report generated by report generator 401 on Web interface using browser software. In a preferred embodiment, when the report generator receives a request to generate a report, the report generator accesses the database 302 within element 102 to retrieve the relevant data via database management system 301. Depending on the request, the report generator may either format the data for display to the user via the Web services element or provide the report to the database repository element 102 for storage and later retrieval. A software program such as Seagate™ CrystalInfo™ may used as the report generator software in report generator 401.

In the preferred embodiment depicted in FIG. 4, the application services element 103 further comprises a session manager 403 for providing server based session management for connections between the system 100 and the financial systems 106 and 112 and existing systems 130. A session consists of a series of commands to complete a task. In preferred embodiment, the session manager 403 recognizes each command and performs the corresponding set of steps to needed to complete the task called for by the command. For example, the commands comprising a session between the system 100 and financial system 106 may comprise authentication commands between the system 100 and financial system 106 (to authenticate the identity and clearance of each system to the other), commands to transfer a file, commands to process the file, and a logoff command. The session manager preferably may be programmed to perform session management tasks using any session management protocols and techniques as may be known in the art. In a preferred embodiment, session manager 403 performs session management by providing commands to login manager 201, SNA gateways 202, and/or network data mover 203 in element 101.

In the preferred embodiment shown in FIG. 4, session manager 403 is coupled to a navigator 404. The navigator 404 executes the functionality of system 100 based upon predetermined or dynamic custom application logic, as may be known in the art. Dynamic application logic may, for example, enable automatic reconfiguration of the Navigator 404 programming as external systems are added to or removed from communications network 105. In a preferred embodiment, in response to a command received from web services element 104, existing systems 130, or financial systems 106 and/or 112, navigator 404 applies its application logic to determine what steps are needed to complete the task called for by the command and sends appropriate commands to the data repository element 102 and/or session manager 403. For example, if a user enters a request for information at remote terminal 110 or customer service terminal 120, the web services element 104 receives the command (as described in further detail below) and transmits it to navigator 404. Navigator 404 then contacts the database management system 301 of data repository element 102 to determine whether the information requested by the user is stored in database 302. If so, the database management system 301 provides the requested information to the web services element 104 for transmission to remote terminal 110 or customer service terminal 120. If the requested information is not stored in database 302, the database management system 301 sends a signal to navigator 404 that the requested information is not available in database 302. Using its custom application logic, navigator 404 may then determine which external systems must be contacted in order to obtain the requested information and may provide corresponding source access command signals to session manager 403. Navigator 404 may access several systems to complete a command task. Once it has determined which external systems must be contacted to obtain the requested information, navigator 404 provides corresponding command access signals to session manager 403, which initiates sessions with financial systems 106 and/or 112 or existing systems 130 via element 101 in accordance with the commands received from navigator 404. In a preferred embodiment, information sent by the external systems as a result of these sessions may be received by element 101, read and processed by processor 402, stored in data repository element 102, and transmitted to remote terminal 110 or customer service terminal 120 by web services element 104. In this manner, system 100 may provide authorized users with on-line access to information stored both in database repository element 102 and all external systems connected to network 105 (e.g., 106, 112, and 130). Techniques and methods for accomplishing these functions are known to those of skill in the art.

Another example of the operation of navigator 404 in a preferred embodiment involves a command to change an account spending limit entered by an authorized user at remote terminal 110 or customer service terminal 120. In response to this command, navigator 404 may provide the new credit account limit information to database repository element 102 for storage within system 100 and may also generate a command access signal for session manager 403 to initiate sessions with financial system 106, financial system 112, and/or existing systems 130 to provide the new credit limit to the appropriate independent systems. The credit data is formatted by processor 402 and network data mover 203 and transmitted by SNA gateways 202 to the external systems. In this way, system 100 enables an authorized user of system 100 to control financial transactions of the entity performed or facilitated by the external systems in real time.

In a preferred embodiment of the present invention, navigator 404 may also be programmed to automatically initiate sessions periodically with independent financial systems, e.g., 106 and 112, and/or existing systems 130, through session manager 403, in order to obtain updated financial and other information for storage in data repository element 102.

As described above, session manager 403 and navigator 404 of application services element 103 preferably provide authorized users and customer service representatives with an interface to independent systems 106, 112, and 130 and the ability to access, manipulate, and modify data stored in the data repository element 102. Users and/or customer service representatives may initiate a variety of monitoring, controlling, and updating functions that are performed in real time and also maintained by system 100 in database 302. For example, in a preferred embodiment, an authorized program administrator may set up individual accounts, including defined authorizations, to perform certain types of transactions. Authorized end users may perform general account inquiries to obtain balance information, available spending information, authorization information and transaction information. Authorized end users may perform maintenance on an account such as address changes, spending control changes, account hierarchy, account status (e.g., open or closed), and submit supply requests (e.g., for travelers checks, convenience checks, etc.). Account system and general ledger mapping functions may be used by authorized end users to define the default rules for mapping cost center and general ledger information to transactions. Transaction verification and reconciliation functions may (1) enable authorized end users to perform transaction verification in order to certify that transactions are accurate; (2) allow authorized end users to override default cost centers or general ledger information. (3) allow authorized end users to dispute transactions according to predefined rules and regulations and track disposition; and (4) allow authorized end users to request copies of transaction records. Authorized end users may also request and schedule predefined reports and create and design new report formats and schedules.

In a preferred embodiment, various additional functions and capabilities may be implemented. For example, a security administration feature may be implemented in session manager 403 and/or navigator 404 by custom programming of either or both components in order to set up user profiles and perform maintenance functions and/or to restrict users to authorized functions within the system. On-line help functions may provide users with context-sensitive and page-sensitive on-line help. A work-in-process queuing feature may allow cardholders with accounts on the system to request card maintenance functions that are directed to a program coordinator. A program coordinator may use the system 100 to identify new, pending, and processed requests. A multiple product administration feature may allow authorized users to administer multiple types of accounts, such as purchase card accounts, travel card accounts, fleet card accounts, inter-agency or inter-departmental accounts, and electronic checkbook accounts. Users may also analyze the data in detail by accessing increasingly detailed data sets. This "drill down" functionality gives users the ability to analyze complex data sets. These functions and capabilities, as well as additional user-initiated or automated functionality, may be implemented by the session manager 403 and navigator 404 as may be apparent to one of skill in the art.

Figure 5:
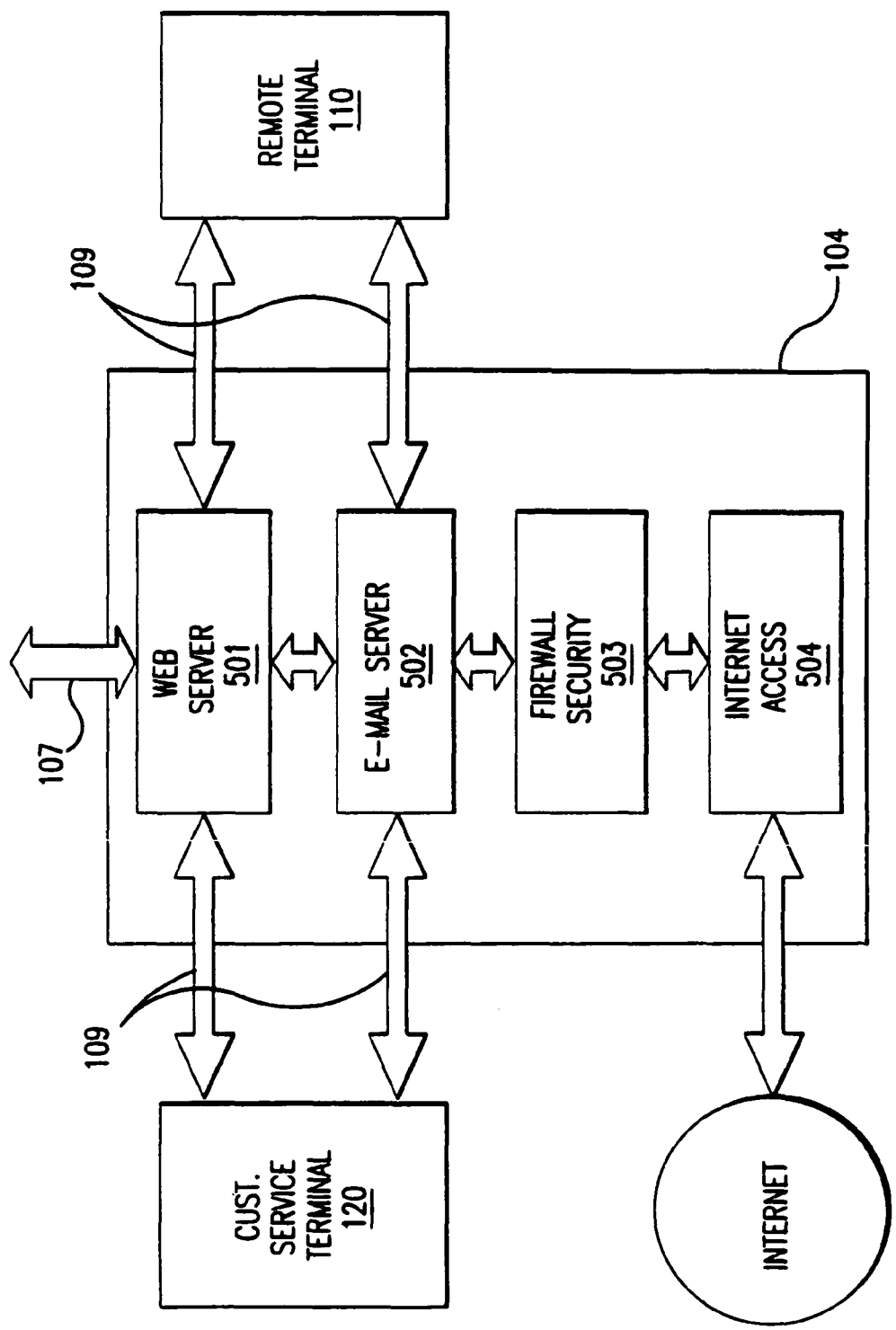
FIG. 5 provides a block diagram of a preferred embodiment of a web services element for use in the system depicted in FIG. 1.

FIG. 5 depicts a preferred embodiment of a web services element 104 of system 100. Web services element 104 preferably supports a closed, private, secure intranet that provides users with a graphical interface for account inquiry, reporting and account maintenance to the customer service access terminal 120 and the remote terminal 110. The web services element 104 preferably includes a web server 501 (e.g., an Oracle® server or Internet secure server) that serves web pages to a browser on the remote terminal 110 or customer service access terminal 120. The web server 501 preferably also provides a direct connection to the application services element 103 to process data access and maintenance requests. In a preferred embodiment, data access and maintenance requests entered by users are forwarded by web server 501 to navigator 404, which performs the commanded task in accordance with custom application logic as described above with reference to FIG. 4.

In a preferred embodiment depicted in FIG. 5, web services element 104 further includes an electronic mail server 502 for providing e-mail receipt and transmission services. The web services element 104 preferably also maintains the software developed for web pages (used with system 100) including form-based pages and form handler pages that provide the graphical user interfaces for account inquiry, reporting, and maintenance, ps 110 and the web server 501. Internet access may be provided by optional Internet server 504.

In the preferred embodiment depicted in FIG. 5, a firewall security module 503 provides security to the system 100. The firewall security module 503 may provide firewall security for system 100 using security techniques and protocols as are known in the art.

As shown in FIG. 1, end users may access web services element 104 of the system 100 using remote terminal 110 and communications link 109. In a preferred embodiment, remote terminal 110 is programmed with the software necessary to communicate with system 100 via a communication link 109 such as a closed intranet network from a remote PC or other client site terminal. The PC may integrate web browser software, e-mail software, and a dial-up network facility. The PC may also host the capability to export report data sets from the system 100 for local storage and off-line use. The PC functionality may be implemented using software and/or hardware as may be known to those of skill in the art.

Figure 6:
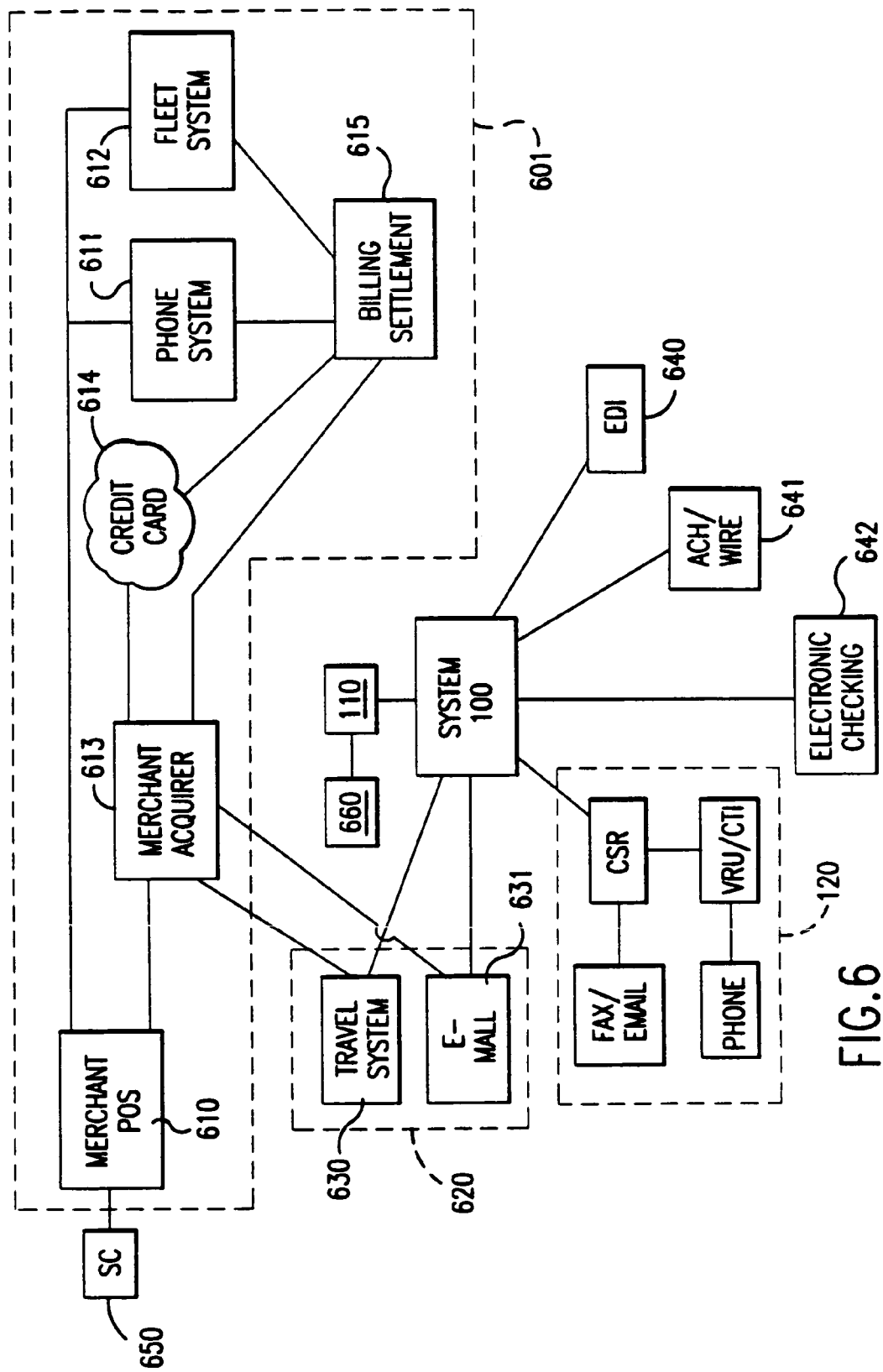
FIG. 6 provides a block diagram of a communications network including a plurality of financial systems and the consolidating system depicted in FIG. 1.

With reference to FIG. 6, the system 100 may be incorporated into a communications network including a plurality of different types of external systems (such as financial systems 106 and 112 in FIGS. 1-5), each operating on a different system platform. For example, in the preferred embodiment shown in FIG. 6, system 100 is implemented within a network including a plurality of different financial systems such as a merchant transaction network 601, a web-based purchasing system 620, an electronic data interchange ("EDI") network 640, an Account Clearing House (ACH/WIRE) network 641, an electronic checking system 642, and a customer service network 120 (which enables fax, e-mail and telephone connectivity to system 100).

In a preferred embodiment depicted in FIG. 6, merchant transaction network 601 may include, for example, a merchant point-of-sale terminal 610, a phone system 611 in the event that the purchase is a phone transaction, and a Fleet system 612 in the event that the transaction is a governmental or business Fleet transaction. Merchant transaction network 601 may further include a merchant acquirer system 613 for other types of transactions including a credit card system 614 for external transactions and a billing settlement system 615 for internal transactions between divisions within an entity.

In a preferred embodiment depicted in FIG. 6, web-based purchasing system 620 may include a travel system 630 and an electronic mall 631, both linked to system 100 and merchant acquirer system 613. Both the travel system 630 and the electronic mall may be, for example. Web sites at which the users can purchase a variety of products and services, such as travel tickets or office supplies. In a preferred embodiment, users of the system 100 can navigate to such Web sites through the Internet connection 504 provided in Web services element 104. Web services element 104 may also be programmed to provide users with predefined hyperlinks to facilitate access to these Web sites.

According to another preferred embodiment depicted in FIG. 6, transactions at the merchant point-of-sale terminal 610 may be performed using smart card technology as may be known to one of skill in the art. In a preferred embodiment depicted in FIG. 6, smart card access to the network is represented by smart card element 650 connected to merchant point-of-sale terminal 610.

According to another embodiment of the present invention, smart cards may be used to access the system 100. A remote terminal 110 with an optional attached smart card reader (shown as 660 in FIG. 6) may use the data stored on smart cards to authorize usage of the system.

The operation of the system 100 and its components as described above will now be described in further detail with reference to FIGS. 7 and 8.

Figure 7:
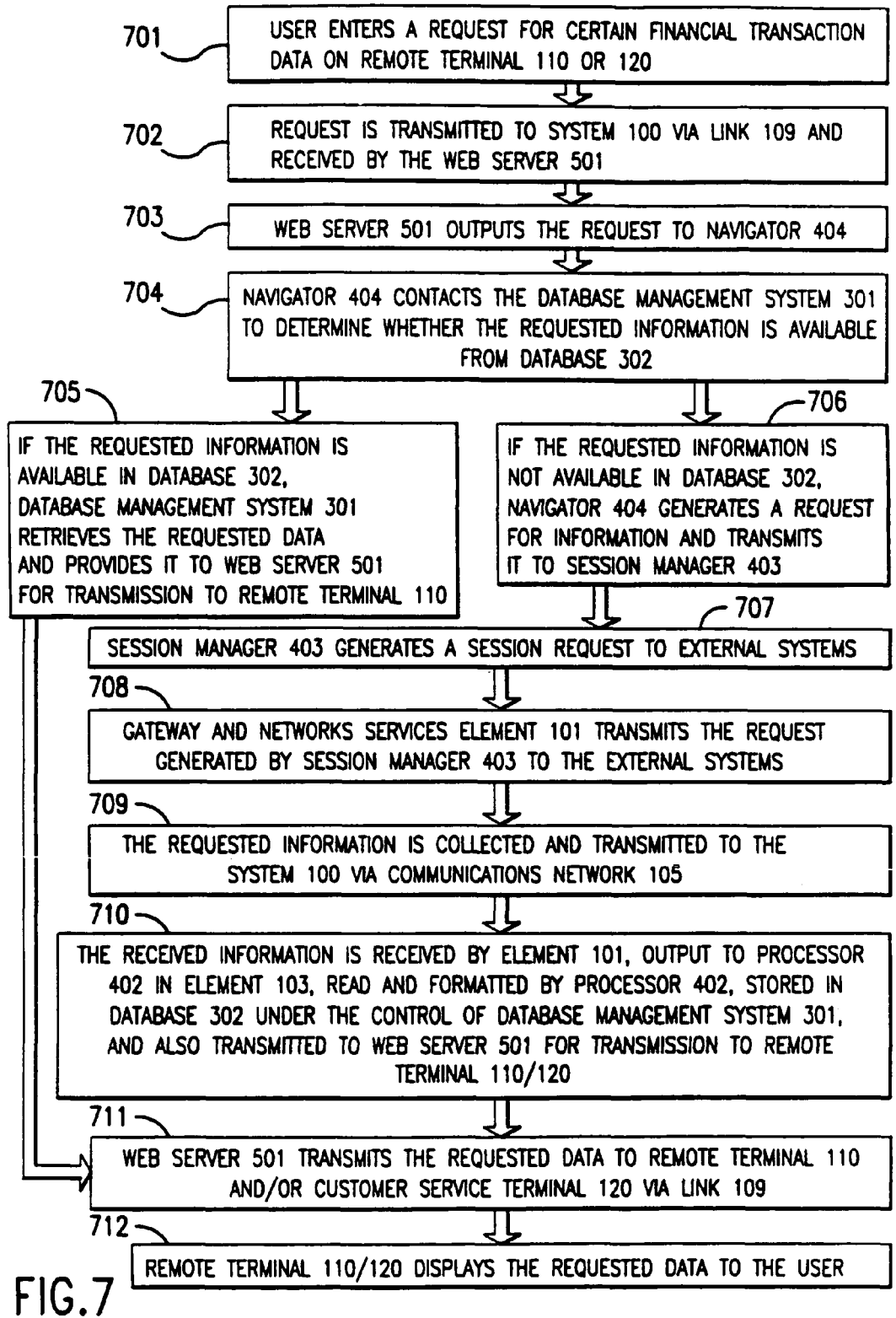
FIG. 7 provides a block diagram of a preferred method for obtaining financial transaction data in response to a user input performed by the system depicted in FIG. 1.

FIG. 7 illustrates a preferred embodiment of a method according to the present invention in which system 100 obtains financial transaction data from one or more financial systems 106 and 112 in response to a user input. The method of FIG. 7 includes the following steps.

701: A user enters a request for certain financial transaction data using remote terminal 110 or customer service terminal 120.

702: The request is transmitted to system 100 via link 109 and received by the web server 501.

703: Web server 501 outputs the request, via communications link 107, to navigator 404 in application services element 103.

704: Navigator 404 contacts the database management system 301, via communications link 107, to determine whether the requested information is available from database 302.

705: If the requested information is available in database 302, database management system 301 retrieves the requested data and provides it to web server 501, via communications link 107, for transmission to remote terminal 110.

706: If the database management system determines that the requested information is not stored in data repository 102, navigator 404 generates a source access command signal and transmits it to session manager 403 (as described in detail above with reference to FIG. 4).

707: Session manager 403 generates a session request to initiate a session with one or more appropriate independent systems (i.e., those capable of providing the requested information) and generates a request for the information using a predetermined data format and transmission protocol.

708: The gateway and networks services element 101 transmits the request generated by session manager 403 to the independent systems (e.g., 106 and 112) via communications network 105, in accordance with addressing information generated by session manager 403.

709: Upon receipt of the request at the independent systems (e.g., 106 and 112), the requested information is collected and transmitted to the system 100 via communications network 105.

710: The received information is received by element 101, output via communications link 107 to processor 402 in element 103, read and formatted by processor 402, transmitted via communications link 107 to data repository services element 102, stored in database 302 under the control of database management system 301, and also transmitted via communications link 107 to web server 501 for formatting and transmission to remote terminal 110 (or customer service terminal 120).

711: Web server 501 then transmits the requested data, via communications network 105, to remote terminal 110 and/or customer service terminal 120 via link 109.

712: Remote terminal 110 and/or customer service terminal 120 then displays the requested data to the user.

According to an alternate preferred embodiment of the method of the present invention (not shown), navigator 404 is programmed to automatically initiate a polling operation of the financial systems 106 and 112 periodically, for example, hourly or daily, to update the data stored by system 100 in database repository element 102. In the polling operation, a transaction data request is generated by navigator 404 and sent to session manager 403. In response, session manager 403 generates a session request for transmission to financial systems 106 and 112 by gateway and network services element 101. Information received from external systems 106 and/or 112 is processed according to the method illustrated in FIG. 7, stored in database 302, and transmitted to remote terminal 110 (or customer service terminal 120) by web browser 501.

According to an alternate preferred embodiment of the system of the present invention (not shown), report generator 401 is programmed to automatically initiate a transaction data request, which is sent to data repository element and processes by database management system 301. Reports generated by report generator 401 may be stored in database 302, transmitted to remote terminal 110 or customer service terminal 120 by web server 501, and/or transmitted to systems 106, 112, and/or 130 as illustrated in FIG. 7.

According to an alternate preferred embodiment of the system of the present invention (not shown), each financial systems 106 and 112 is programmed to automatically transmit financial transaction data to the system 100 periodically, for example, hourly or daily, to update the information stored by the system in database 302.

According to an alternate preferred embodiment of the system of the present invention (not shown), financial transaction data may be obtained from the financial systems 106 and 112 in any and/or all of the methods used in the above-described preferred embodiments, or in other methods for obtaining information as may be known in the art.

Figure 8:
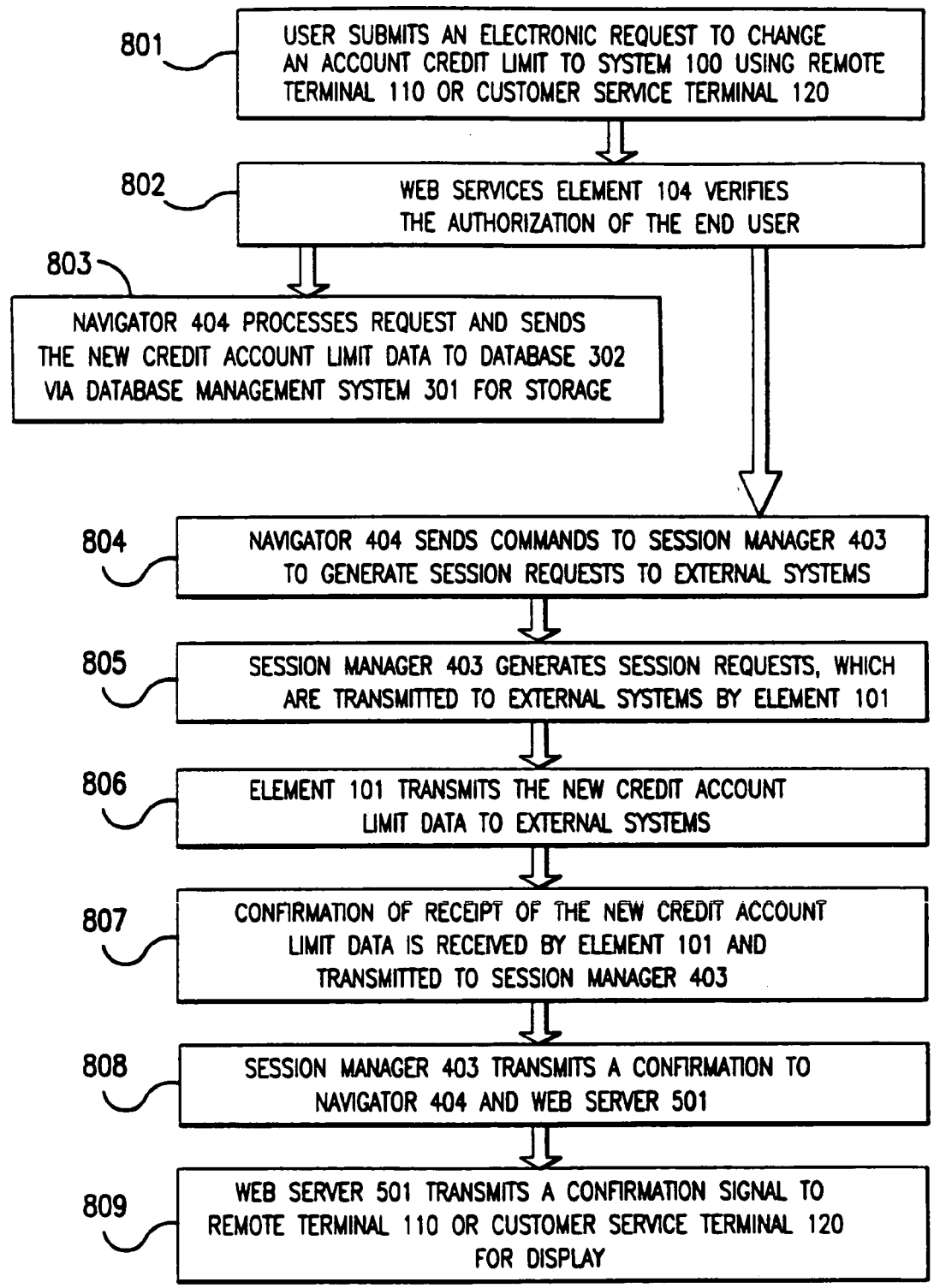
FIG. 8 provides a block diagram of a preferred method for modifying financial transaction data in response to an user input performed by the system depicted in FIG. 1.

FIG. 8 illustrates a preferred embodiment of the method of the present invention, in which an authorized user or customer service representative using system 100 may create, edit, and delete data stored in data repository element 102 and/or systems 106, 112, and 130. The method shown in FIG. 8 includes the following steps.

801: An authorized user or customer service representative submits, via communications network 109, an electronic request to change an account credit limit to system 100 using the browser software package installed on the remote access terminal 110 or customer service access terminal 120.

802: The web services element 104 of system 100 verifies the authorization of the end user.

803: The user's request is transmitted, via communications link 107, to navigator 404 and is processed by navigator 404, which sends the new credit account limit, via communications link 107, to data repository element 102, where data base management system 301 directs it to be stored in database 302. The new credit account limit is thus stored in system 100.

804: In addition to sending the new credit account limit data to database repository element 102, navigator 404 also generates source access commands to session manager 403 to generate session requests to systems 106, 112 and/or 130 (and all external systems that store credit account limit data).

805: Session manager 403 generates session requests, which are transmitted to systems 106 and 112 by network services and gateway element 101 using communications network 105.

806: During a session, element 101 transmits the new credit account limit data, using communications network 105, to systems 106 and 112, where it is processed and stored.

807: Confirmation of receipt of the new credit account limit data is received by element 101, via communications network 105, and transmitted to session manager 403 using communications link 107.

808: In response to the confirmation signal received from element 101, session manager 403 transmits a confirmation to navigator 404 and, using communications link 107, web server 501.

809: In response to the confirmation signal received from session manager 403, web server 501 transmits a confirmation signal to remote terminal 110 or customer service terminal 120, using communications network 109.

The preferred method illustrated in FIG. 8 enables an authorized user of system 100 to modify, and thereby control, financial account information in real time. Similar processes may be performed for other functions, such as addition, modification and/or deletion of accounts by authorized users and customer service representatives.

Figure 9:
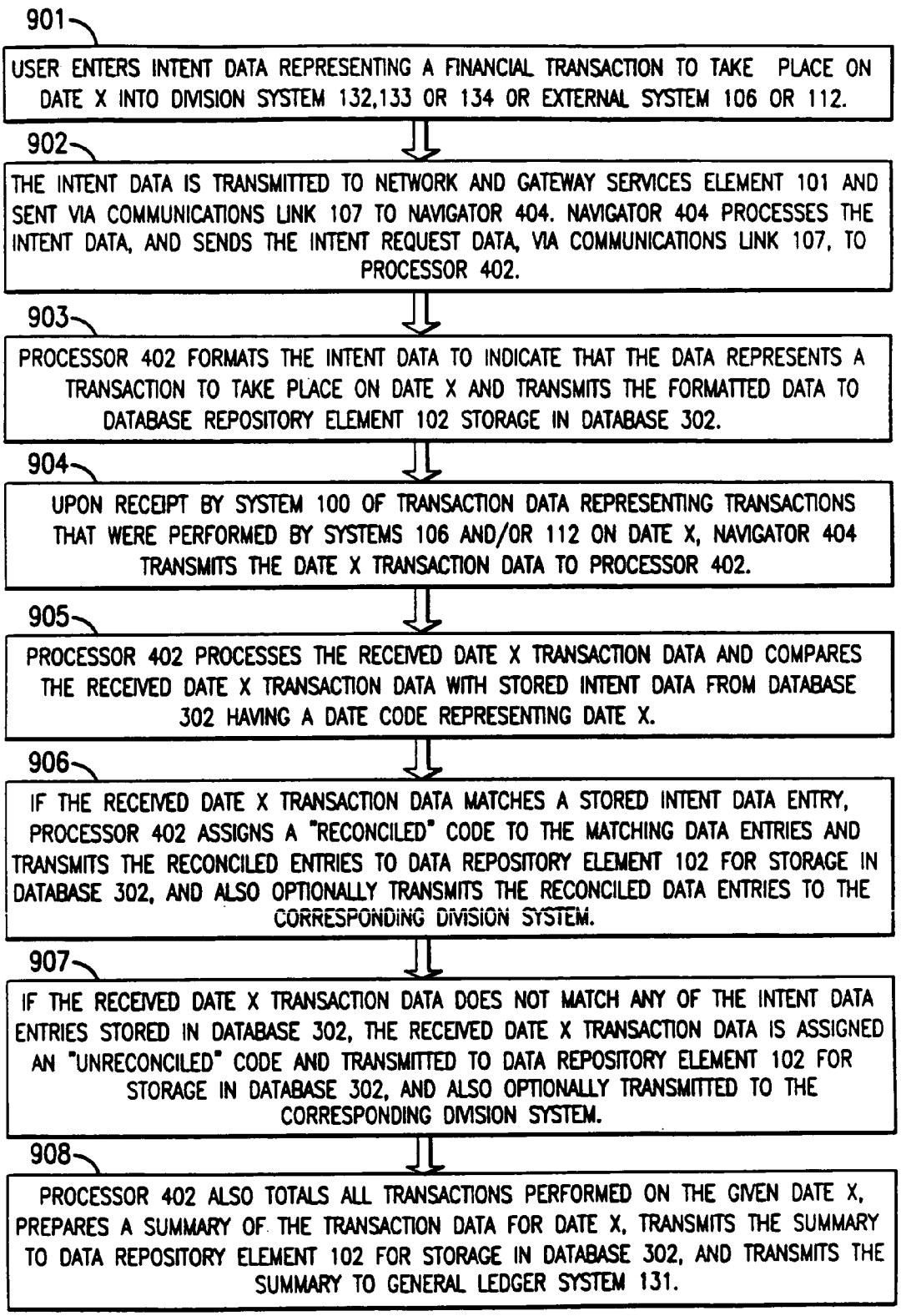
FIG. 9 provides a block diagram of a preferred method of reconciling transaction intents and transactions performed by the system depicted in FIG. 1.

A preferred method for tracking, storing and reconciling financial transaction data for existing systems 130 as performed by system 100 is illustrated in FIG. 9. Reconciliation functionality enables entry into the system of data indicating an intent to perform a defined financial transaction on a future date and subsequent reconciliation of the intent data with the corresponding financial transaction data when the financial transaction data is received by the system 100, for example, from systems 106 and/or 112. The system automatically matches and reconciles the two entries. Upon accessing an account stored by the system 100, reconciled and unreconciled (non-matching) transactions may be displayed.

Tracking, storing, and reconciliation of financial transaction data for existing systems 130 may be accomplished through the following steps (with reference to the system diagram shown in FIG. 1 and existing systems component shown in FIG. 1B).

901: A user enters financial transaction intent data ("intent data") into a division system (e.g., 132, 133 or 134) within existing systems component 130 or into an external system such as system 106 or 112. The intent entry indicates the user's intent to perform a defined financial transaction on a given date X in the future.

902: The intent data is transmitted to network and gateway services element 101 and sent via communications link 107 to navigator 404. Navigator 404 processes the intent data, and sends the intent request data, via communications link 107, to processor 402.

903: Processor 402 formats the intent data to indicate that the data represents a transaction to take place on the given date X and transmits the formatted data to database repository element 102 for storage in database 302.

The storage process for intent data is repeated as users enter intent data into the division systems 132, 133 and 134. According to a preferred embodiment of the present invention, all intent data entries representing transactions to take place on the same given date X are formatted by processor 402 to include a date code or data flag corresponding to the given date X.

904: As system 100 receives transaction data representing transactions that were performed by systems 106 and/or 112 on the given date X, navigator 404 transmits the date X transaction data to processor 402.

905: Processor 402 processes the received date X transaction data and compares the received date X transaction data with stored intent data from database 302 having a date code representing date X.

906: If the received date X transaction data matches a stored intent data entry, processor 402 assigns a "reconciled" code (e.g., using a data flag or data field entry) to the matching data entries and transmits the reconciled entries to data repository element 102 for storage in database 302. Processor 402 may also optionally transmit the reconciled data entries to the corresponding division system (e.g., 132, 133 or 134) from which the intent data was received.

907: If the received date X transaction data does not match any of the intent data entries stored in database 302, the received date X transaction data is assigned an "unreconciled" code and transmitted to data repository element 102 for storage in database 302. Processor 402 may also optionally transmit the unreconciled transaction data entry to the corresponding division system (e.g., 132, 133 or 134) for which the transaction was performed.

908: Processor 402 also totals all transactions performed on the given date X, prepares a summary of the transaction data for date X (for example, a total debit or credit amount for all transactions on date X), transmits the summary to data repository element 102 for storage in database 302, and transmits the summary to general ledger system 131. As new transaction data from date X is received from systems 106 and 112, processor automatically updates the summary for date X and transmits it to data repository element 102 and general ledger system 131. In this way, the system 100 and the entity's general ledger system 131 maintain an accurate account of the financial transactions of the entity as transaction data is received by system 100.

In another preferred embodiment of the system according to the present invention, system 100 may periodically receive audit data from external systems 106 and/or 112. The received audit data includes data corresponding to each transaction performed by the external system 106 or 112. Upon receiving the audit data from the external systems 106 and/or 112, processor 402 processes the received audit data and compares the transactions described in the audit data with the reconciled and unreconciled transaction data stored in data repository element 101 and sent to division systems 132, 133, and 134 and general ledger system 131. Any discrepancies may be automatically highlighted upon accessing the corresponding accounts stored by system 100 using remote terminal 110, customer service terminal 120, general ledger system 131, and/or the division systems 132, 133 and/or 134.

According to a preferred embodiment of the system and method of the present invention, financial transaction and account data maintained by the system 100 in data repository element 102 may include various account fields, depending on the needs of the entity and the requirements of the industry. For example, financial transaction data fields may include: financial system or bank identification numbers or codes, billing cycle identifiers, agent bank identifiers, corporate account numbers, control account numbers, account-holder name data, account-holder social security data, various types of account-holder information (address, phone number, spouse, date of birth, credit rating, etc.), account type, account tax indicator, account code, and/or employee ID data. Financial transaction data may also include one or more of the following types of transaction data fields: posting date, transaction date, merchant description, source currency code, billing currency code, foreign currency amount, reference number, merchant standard industry code, transaction amount, transaction code, merchant location data, sales tax, purchase identifier, memo indicator (indicates transaction charged to control or corporate account), transaction type, debit/credit status, card acceptor ID, minority vendor flag, and/or incorporation vendor flag. For airline-related transactions, as another example, data fields may include: account number, reference number, ticket number, carrier code, service class, stop over, destination code, travel agency code, travel agency name, passenger name, departure date, and/or origination code. For car rental and lodging transactions, as a further example, field data may include: account number, reference number, no show flag, extra charges, extra charge amount, check-in/check-out date, hotel or car rental company identifier, and/or passenger/guest name. In an additional example, telephone card transaction fields may include account number, reference number, destination phone, origination phone, time and duration.

In addition to financial transaction data, the system according to the present invention may also collect and maintain account and control data for all accounts within the entity. Account data fields for individual and control data may include: debit total, credit total, payment total, previous cycle date, previous cycle account balance, current cycle account balance, credit limit, payment due, cycles past history, high delinquency, past amount due, chargeoff amount, dispute amount, number of cards, and/or dispute indicator. Corporate and agency level account information fields may include: agent bank, company number, number of accounts, credit limit, payments due, accounts past due, past due amount, chargeoff amount, disputed amount, number of card, name of company/agency, address data, account number data, annual fee amount and month, due date, open date, disputed transactions detail, chargeback processed, and/or reissue date. Rolling authorization data fields may include account number, available credit, merchant number, merchant city, merchant state, merchant description, point-of-sale entry mode, authorization date, authorization time, authorization amount, foreign currency code, foreign currency conversion rate, authorization/decline code, merchant standard industry code, merchant zip code, and/or merchant country code. Account change information (i.e., information concerning changes made to accounts that is stored by system 100) may include one or more of the following data fields: account number, account type, item changed, old value, new value, date of change, time of change, and operator identification number or code. As is apparent to one of skill in the art, various different types of financial and other information can be stored, processed, transmitted and reported using the system and method of the present invention.

In a preferred embodiment, storage and organization of all data described above are managed by database management system 301. In a preferred embodiment, all current and historical data maintained by system 100 is stored in database 302.

In a preferred embodiment of the present invention, reports generated by report generator 401 within application services element 103 may be formatted in numerous formats, including selected information of interest to the recipient of the report. Examples of reports generated by report generator 401 may include:

| Report Title | Report Description |
| --- | --- |
| 1099 Report | Provides 1099 information |
| Account Aging Analysis/Risk Report | Provides reporting on accounts with are past due, overlimit, or have a high credit line utilization |
| Account Cash Advance | Provides reporting on all "cash" transactions including cash advances or transfers of value at ATM or banking centers and associated fees |
| Account Change Report | Provides reporting on all maintenance with has occurred to an account |
| Account Change Request Report | Provides reporting on all maintenance requested by an agency or company for its accounts |
| Account Cycle (Cardholder Statement) | Provides reporting on all transactions for an account |
| Account Listing | Provides a listing of all accounts for a particular company, entity or agency |
| Account Spending Analysis | Provides reporting on the types of transactions made by an entity's cardholders or account-holders |
| Account Spending Exceptions Report | Provides reporting on transactions requiring special attention by the entity |
| Account Set-Up Summary | Provides summary reporting on new account setups |
| Airline City Pair Frequencies | Provides reporting on the frequency with which an entity's cardholders or account holders have flown between selected cities |
| Airline Credit | Provides reporting on the amounts credited to the entity's accounts by airlines |
| Airline Itinerary Authorizations | Provides reporting on all airline itineraries Outstanding authorizations for which transactions have not posted |
| Card Reissue Reporting | Provides reporting on all cards issued or reissued |
| Chain/MCC Frequency Analysis | Provides reporting on transactions for particular transaction types for entity cardholders and/or account holders. This report is based on transaction type. This report may be broken down by airline, hotel or rental car agency. |
| Control Unit Listing/Account Setup & Review Reporting | Provides reporting on account setup including credit lines assigned, transaction limits and controls and hierarchy |

-continued

| Report Title | Report Description |
| --- | --- |
| Financial Adjustment Report | Provides reporting on financial adjustments made to an account by a representative of the entity |
| Credit Card Income Summary | Provides an outline of revenues and expenses for credit card operations |
| Counterfeit/Lost/Stolen Reporting | Provides reporting for account that have been reported lost or stolen or have been identified as having counterfeit activity occur |
| Declined Transaction Report | Provides reporting on transactions declined for a particular account or cardholder |
| DMA/City State Analysis | Provides reporting on transactions made within a specific DMA, city or state locality |
| Financial Adjustment Report | Provides reporting on financial adjustments made to an account by an associate |
| Foreign Spending | Provides reporting on transactions that were made in foreign countries, including originating country and currency, date of transaction, amount of transaction in foreign currency, posting date and rate of exchange, and amount of transaction in US dollars as of the date of posting |
| New Account Report | Provides reporting on all new accounts, including the number of new account setup forms received, dollar amount of account lines requested, number of cards requested, account setup processing turnaround time and the state in which the setup form was initiated |
| No Authorizations | Provides reporting on all transactions which posted for which no authorization was obtained |
| Phone Call Analysis | Provides reporting on all phone calls made by a cardholder or account holder |
| Quarterly Operating Certificate | Provides general account information and reporting to card association regarding an entity's portfolio |
| Report Forecast | Provides a listing of reports scheduled for automatic production for the entity |
| Report Manifest | Provides a listing of reports in today's production run for the entity |
| Tax Report | Provides reporting on taxes paid where cardholder or account holder was tax exempt |
| Transaction Detail Report | Provides reporting to a merchant for all transactions that have been transacted using a card account |
| Transaction Dispute Status Report | Provides reporting and status on items in dispute and/or status in chargeback process |
| Rejected Items | Provides reporting on transactions that were processed by the system 100 but were unable to be posted |

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

We claim:

1. A method for consolidating, monitoring and controlling financial transactions of an entity, comprising:

receiving, by a computing device, control commands from a remote access terminal or from one or more of a plurality of financial systems external to the system;

identifying, by a computing processor, one or more sources of information required to consolidate, monitor, or control the financial transactions of the entity in response to the control commands;

generating, by a computing processor, source access command signals that correspond to the one or more sources of information;

generating, by a computing processor, session commands in response to the source access command signals; and accessing, by a computing device, the one or more sources of information in response to the session commands.

2. The method of claim 1, wherein at least one of the one or more sources of information is a financial system external to the system.

3. The method of claim 1, wherein the identifying step is carried out using a navigator.

4. The method of claim 1, wherein the step of generating session commands is carried out using a session manager.

5. The method of claim 1, further comprising: storing, in computing memory, information received by the system in response to accessing the one or more source of information.

6. A system for consolidating, monitoring and controlling financial transactions of an entity, the system including a computer and software configured to execute functionality comprising:

a navigator that identifies one or more sources of information required by said system to consolidate, monitor, or control the financial transactions of the entity in response to control commands received from a remote access terminal or from one or more of a plurality of financial systems, wherein the navigator generates corresponding source access command signals;

a session manager coupled to said navigator, wherein said session manager generates session commands in response to said source access command signals; and a network and gateway services element for accessing the plurality of financial systems in response to said session commands received from said session manager.

7. The system of claim 6, wherein said control commands received by said navigator are requests for financial data.

8. The system of claim 7, wherein said navigator determines whether the requested financial data is stored within said system, and, if not, identifies one or more of the plurality of financial systems to enable said system to automatically obtain the requested financial data from the identified financial systems.

9. The system of claim 6, wherein said control commands received by said navigator are update commands containing financial data to be stored either in said system or in one or more of the plurality of financial systems.

10. The system of claim 9, wherein said navigator identifies one or more of the plurality of financial systems that store the financial data contained in said update commands, and generates source access commands corresponding to the identified financial systems to automatically update financial data stored in the plurality of financial systems.

* * * * *